US010859992B2

(12) United States Patent
Edwards (10) Patent No.: US 10,859,992 B2
(45) Date of Patent: Dec. 8, 2020

(54) VEHICLE-BASED GEO-FENCING SYSTEM (71) Applicant: Toyota Motor North America, Inc., Plano, TX (US)

(72) Inventor: Michael C. Edwards, McKinney, TX (US)

(73) Assignee: TOYOTA MOTOR NORTH AMERICA, INC., Plano, TX (US)

(*) Notice: Subject to any disclaimer, the term of this patent is extended or adjusted under 35 U.S.C. 154(b) by 0 days.

(21) Appl. No.: 16/160,512

(22) Filed: Oct. 15, 2018

(65) Prior Publication Data
US 2020/0117154 A1 Apr. 16, 2020

(51) Int. Cl.
*G05B 19/042* (2006.01)

(52) U.S. Cl.
CPC ...... *G05B 19/042* (2013.01); *G05B 2219/163* (2013.01); *G05B 2219/25062* (2013.01); *G05B 2219/2614* (2013.01); *G05B 2219/2625* (2013.01); *G05B 2219/2628* (2013.01); *G05B 2219/2637* (2013.01)

(58) Field of Classification Search
CPC .......... G05B 19/042; G05B 2219/163
See application file for complete search history.

(56) References Cited

U.S. PATENT DOCUMENTS

| 7,778,604 | B2 | 8/2010 | Bauman et al. |
| 8,749,375 | B2 | 6/2014 | Nguyen et al. |
| 9,378,601 | B2 | 6/2016 | Ricci |
| 9,495,866 | B2 | 11/2016 | Roth et al. |
| 10,043,331 | B1* | 8/2018 | Johnson ............... H04L 12/2823 |
| 2003/0043021 | A1* | 3/2003 | Chung ................ G07C 9/00309 340/5.71 |
| 2003/0060938 | A1* | 3/2003 | Duvall ................ B60R 25/1012 701/2 |
| 2012/0265585 | A1* | 10/2012 | Muirbrook ............. G06Q 20/20 705/13 |
| 2013/0036419 | A1* | 2/2013 | Hazelet .................. G06Q 10/00 718/100 |

(Continued)

FOREIGN PATENT DOCUMENTS

JP 2015095721 A 5/2015
KR 10-2018-0004886 A 1/2018

(Continued)

OTHER PUBLICATIONS

International Search Report and Written Opinion received in corresponding Patent Cooperation Treaty Application No. PCT/US2019/055969, dated Feb. 3, 2020, 9 pages.

*Primary Examiner* — Vincent H Tran
(74) *Attorney, Agent, or Firm* — Haynes and Boone, LLP (57) ABSTRACT

Methods and systems for controlling an automation system. Entrance of an authorized person within a geo-fence for an automation system is detected. A determination is made as to whether the authorized person has entered the geo-fence in a registered vehicle. The automation system is controlled to perform at least one operation from a first set of operations in response to a determination that the authorized person has entered the geo-fence in a registered vehicle. The automation system is controlled to perform at least one operation from a second set of operations in response to a determination that the authorized person has not entered the geo-fence in a registered vehicle.

20 Claims, 6 Drawing Sheets (56) References Cited

U.S. PATENT DOCUMENTS

| | | |
|---|---|---|
| 2013/0231784 A1 | 9/2013 | Rovik et al. |
| 2014/0200739 A1* | 7/2014 | Kirsch .................. H04W 4/023 |
| | | 701/1 |
| 2015/0097669 A1 | 4/2015 | Li |
| 2015/0293509 A1 | 10/2015 | Bankowski et al. |
| 2016/0119890 A1 | 4/2016 | Hollmig |
| 2016/0316322 A1* | 10/2016 | Gillen ................ G06Q 10/0833 |
| 2017/0243479 A1* | 8/2017 | Hill .................... G08B 13/1672 |
| 2017/0249552 A1* | 8/2017 | Boss ....................... G06N 20/00 |
| 2017/0267170 A1* | 9/2017 | Be ........................... B60Q 9/00 |
| 2018/0124573 A1* | 5/2018 | Lee ........................ H04W 4/021 |
| 2018/0191829 A1 | 7/2018 | Morales |
| 2018/0211510 A1* | 7/2018 | Poder .................... B60R 25/102 |
| 2018/0225898 A1* | 8/2018 | Kirkland ............. G07C 9/00111 |
| 2019/0047514 A1* | 2/2019 | Brombach .............. B60R 25/25 |
| 2019/0063140 A1* | 2/2019 | Trundle ................. G06K 9/325 |

FOREIGN PATENT DOCUMENTS

| | | |
|---|---|---|
| WO | 10-2017-0099353 A | 9/2016 |
| WO | WO 2016-138511 A1 | 9/2016 |
| WO | WO 2017176876 A1 | 10/2017 |

* cited by examiner

VEHICLE-BASED GEO-FENCING SYSTEM

FIELD

The present disclosure generally relates to the control of automation systems and, more particularly, to methods and systems for using geo-fencing to provide vehicle-based, customized control of automation systems.

BACKGROUND

Currently, geo-fencing uses a geo-fence to trigger a certain response when a device, typically, a mobile device, enters or leaves a particular area. A geo-fence may be a virtual geographic boundary or virtual perimeter. In some cases, home automation of certain systems may be controlled using a mobile device or a vehicle. For example, when a vehicle is within a predetermined range of a home, various household functions may be performed. These household functions may include, for example, operating a security system, an entertainment system, a garage door opener, or a heating, ventilation, and air conditioning (HVAC) system. However, control of the home automation may be limited in the level of customization that may be performed based on the type of arrival within the predetermined range of the home.

SUMMARY

In one example embodiment, a method is provided for controlling an automation system. The method includes detecting when an authorized person has entered a geo-fence for an automation system. A determination is made as to whether the authorized person has entered the geo-fence in a registered vehicle. The automation system is controlled to perform at least one operation from a first set of operations in response to a determination that the authorized person has entered the geo-fence in a registered vehicle. The automation system is controlled to perform at least one operation from a second set of operations in response to a determination that the authorized person has not entered the geo-fence in a registered vehicle.

In another example embodiment, a method is provided for controlling a home automation system. The method includes detecting when a mobile device of an authorized person has entered a geo-fence of the home automation system. A determination is made as to whether the mobile device is connected to a registered vehicle. The home automation system is controlled to run a first program in response to a determination that the mobile device is connected to the registered vehicle. The home automation system is controlled to run a second program in response to a determination that the mobile device is not connected to a registered vehicle.

In yet another example embodiment, a system for controlling an automation system includes a communications system, a positioning system, and a controller. The communications system establishes a communications link with the automation system. The positioning system generates positioning information. The controller detects when a mobile device of an authorized person has entered a geo-fence of the automation system based on the positioning information. The controller determines whether the mobile device is connected to a registered vehicle. The controller controls the automation system to run a first program in response to a determination that the mobile device is connected to the registered vehicle. The controller controls the automation system to run a second program in response to a determination that the mobile device is not connected to the registered vehicle.

It is to be understood that both the foregoing general description and the following detailed description are exemplary and explanatory in nature and are intended to provide an understanding of the present disclosure without limiting the scope of the present disclosure. In that regard, additional aspects, features, and advantages of the present disclosure will be apparent to one skilled in the art from the following detailed description.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion. In addition, the present disclosure may repeat reference numerals and/or letters in the various examples. This repetition is for the purpose of simplicity and clarity and does not in itself dictate a relationship between the various embodiments and/or configurations discussed.

DETAILED DESCRIPTION

Illustrative embodiments and related methods of the present disclosure are described below as they might be employed in one or more methods and systems for a vehicle-based geo-fencing system for controlling automation at a particular location. In the interest of clarity, not all features of an actual implementation or method are described in this specification. It will of course be appreciated that in the development of any such actual embodiment, numerous implementation specific decisions must be made to achieve the developers' specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure. Further aspects and advantages of the various embodiments and related methods of the disclosure will become apparent from consideration of the following description and drawings.

As described herein, methods and systems of the present disclosure provide a way of customizing automation at a location based on the type of vehicle arrival within a geo-fence corresponding to the location. The location may be, for example, a home. In one example embodiment, an automation control system is used to control the automation of certain operations at a location, customized based on whether or not an authorized person arrives within the geo-fence in a registered vehicle. The registered vehicle may be a vehicle that is owned by the authorized person, registered to the authorized person, or otherwise identified as corresponding to the authorized person. For example, a vehicle may be identified as a "registered vehicle" if a mobile device of an authorized person is successfully connected to the vehicle. A vehicle that is not registered may be, for example, a rental vehicle, a friend's vehicle, a ride-share vehicle, a taxi, or some other type of vehicle.

Once entrance of an authorized person within the geofence has been detected, a determination may be made as to whether the authorized person has entered the geo-fence in a registered vehicle. The automation system is controlled to perform at least one operation from a first set of operations in response to a determination that the authorized person has entered the geo-fence in the registered vehicle. The automation system is controlled to perform at least one operation from a second set of operations in response to a determination that the authorized person has not entered the geo-fence in the registered vehicle. The first set of operations may be distinct from the second set of operations by at least one operation. In this manner, the operations that are performed may be customized based on whether the authorized person has arrived in a registered vehicle or some other vehicle.

Figure 1:
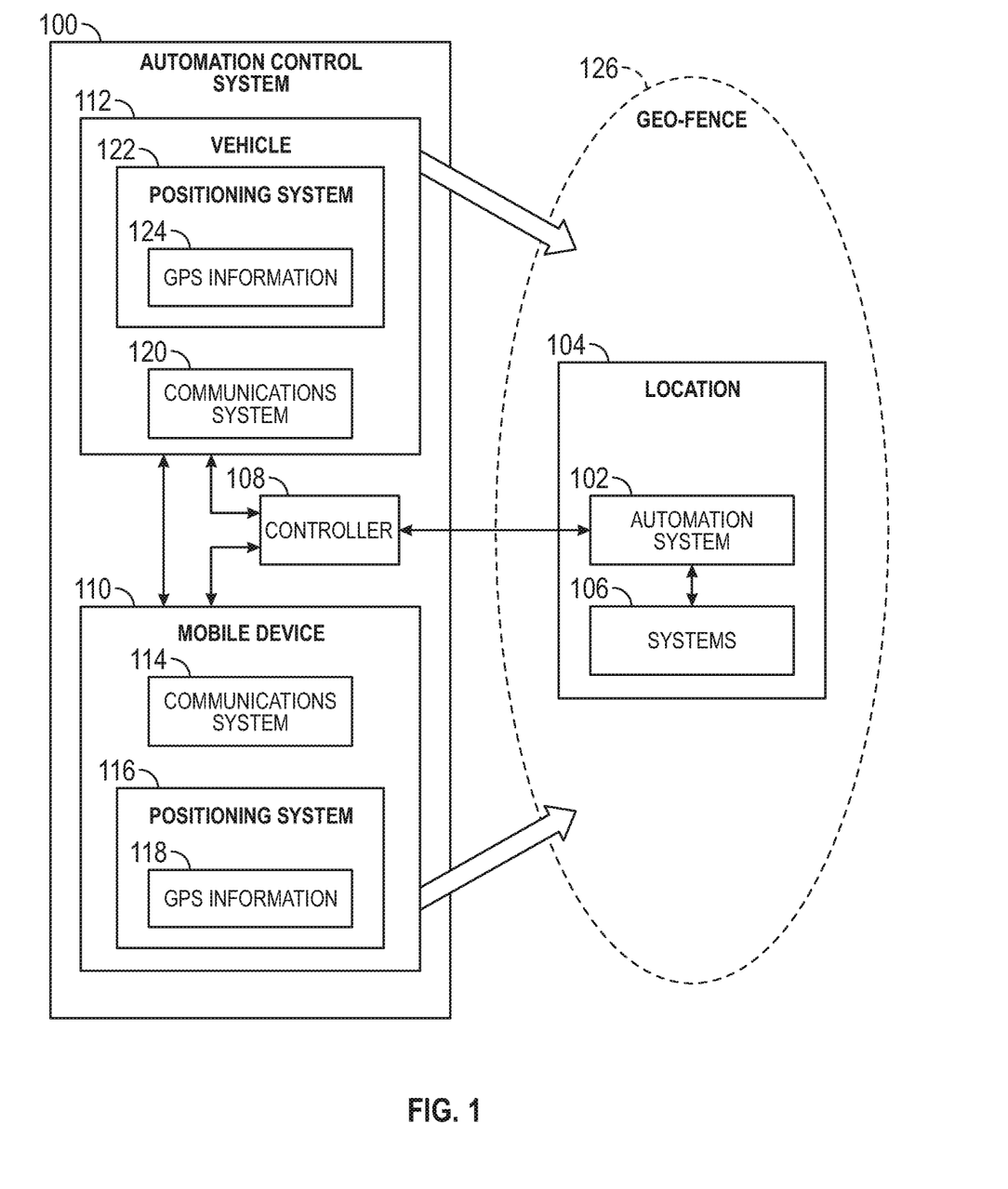
FIG. 1 is a block diagram depicting an automation control system in accordance with an example embodiment.

Referring now to the figures, FIG. 1 is a block diagram depicting an automation control system 100 in accordance with an example embodiment. Automation control system 100 is used to control automation system 102 at location 104. Location 104 may be a home (e.g., a house, a condo, an apartment, or some other type of residence), an apartment complex, a business complex, or some other type of location. When location 104 is a home, automation system 102 may be referred to as a home automation system.

Automation system 102 is communicatively coupled to various systems 106 at or around location 104 to automate various operations typically performed by systems 106. Examples of the different types of systems 106 that may be controlled by automation system 102 are described in greater detail in FIG. 2 below.

In one or more examples, automation control system 100 includes controller 108, mobile device 110 and, optionally, vehicle 112. Depending on the implementation, controller 108 may be implemented within mobile device 110, vehicle 112, or both. For example, controller 108 may be implemented using software, hardware, firmware, or a combination thereof on mobile device 110, vehicle 112, or both. In some examples, controller 108 may be implemented using a single processor or multiple processors in communication with each other. When multiple processors are used, these processors may be in communication with each other using at least one of a wired communications link or a wireless communications link. In some cases, controller 108 may include various components in communication with each other using at least one of wired, wireless, or optical communications links.

When controller 108 is implemented using both mobile device 110 and vehicle 112, the portion of controller 108 on mobile device 110 may be in communication with the portion of controller 108 on vehicle 112. In one example, controller 108 is implemented by an application or program installed on mobile device 110. In yet other examples, controller 108 may be implemented using any number of servers (e.g., physical servers, cloud servers, or both) that are in communication with mobile device 110 and vehicle 112.

Mobile device 110 may take a number of different forms including, for example, a smartphone, a tablet, a laptop, a hybrid tablet-laptop, or some other type of mobile device. Mobile device 110 includes controller 108, communications system 114, and positioning system 116. Communications system 114 allows mobile device 110 to communicate using Bluetooth, NFC, Wi-Fi, some other type of radio communications, or a combination thereof. In some examples, communications system 120 is used to establish a wireless communications link with automation system 102. Positioning system 116 generates positioning information for mobile device 110. For example, positioning system 116 may generate GPS information 118.

Vehicle 112 may take a number of different forms. For example, vehicle 112 may be a car, a truck, a van, an SUV, a smart car, a motorcycle, an electronic bike, or some other type of vehicle. Vehicle 112 includes communications system 120 and positioning system 122. Communications system 120 allows vehicle 112 to communicate using Bluetooth, NFC, Wi-Fi, some other type of radio communications, or a combination thereof. In some examples, communications system 120 may be used to establish a wireless communications link with automation system 102. Positioning system 122 generates positioning information for vehicle 112. For example, positioning system 122 may generate GPS information 124. In one or more examples, communications system 120 and positioning system 116 may be at least partially integrated. For example, vehicle 112 may include a Data Communication Module (DCM) that is used to implement at least a portion of communications system 120 and at least a portion of positioning system 122.

Automation control system 100 is used to detect when an authorized person has entered geo-fence 126. The authorized person may be a person authorized to enter or access location 104. For example, when location 104 is a home, the authorized person may be a resident, a family member, or a pre-authorized guest of the home. When location 104 is an apartment complex, the authorized person may be a resident of one of the apartments of the apartment complex or an employee of the apartment complex. When location 104 is a building, such as a business complex, the authorized person may be an employee of the business or an authorized visitor or customer.

In some cases, the authorized person may be someone who is authorized for both automation system 102 and automation control system 100. A person may be recognized as an "authorized person" in a number of different ways. In one or more examples, the login credentials for a user of mobile device 110 may be used to validate the user as an "authorized person" with respect to automation system 102. In some examples, when controller 108 is at least partially implemented on mobile device 110, the linking of controller 108 and automation system 102 may allow the user of mobile device 110 to be recognized as an "authorized person" with respect to automation system 102. This linking may be performed in different ways.

As one illustrative example, controller 108 may be installed as an application on mobile device 110 and the application linked to or otherwise registered for use with automation system 102 by entry of a code or login information into the application. This code or login information may be specific to automation system 102. Once controller 108 and automation system 102 are linked in this manner, the user of mobile device 110 may be considered an "authorized person" with respect to the automation system 102. As another illustrative example, each of controller 108 and automation system 102 may receive information via user input, either directly or indirectly, that allows controller 108 and automation system 102 to be linked.

Geo-fence 126 is a virtual space corresponding to a virtual boundary or perimeter surrounding location 104. Geo-fence 126 may be a defined area having any of a number of different shapes, sizes, or both. For example, geo-fence 126 may have a circular shape, a rectangular shape, a square shape, or some other type of curved or polygonal shape. In one example, geo-fence 126 may be defined as a circular, virtual boundary surrounding a center point at location 104. This center point may be defined at the physical location of automation system 102 at location 104. In other examples, the center point may be the physical center point of the house, building, or complex. In still other examples, geo-fence 126 may be defined as the virtual boundary around a portion of a building or complex at location 104. For example, when location 104 takes the form of an apartment complex, geo-fence 126 may be a virtual boundary around an area that includes an entry gate to the apartment complex.

When an authorized person is detected within geo-fence 126, automation control system 100 controls automation system 102 to customize the type of operations performed by systems 106 based on the type of vehicle 112 within which the authorized person arrives. For example, certain operations may be performed when the authorized person arrives in his or her own vehicle, while other operations may be performed when the authorized person arrives in a rental vehicle, a friend's vehicle, a ride-share vehicle, a taxi, or some other type of vehicle.

In one or more examples, controller 108 sends information to automation system 102 to control automation system 102. This information may include at least one of a command, a message, instructions, or some other type of information. In some cases, this information may include identification information for vehicle 112. Controller 108 may send this information to automation system 102 over one or more communications links established between automation system 102 and vehicle 112, one or more communications links established between automation system 102 and mobile device 110, one or more communications links established between automation system 102 and one or more servers hosting controller 108, or a combination thereof.

In these examples, communications between controller 108 and automation system 102 are depicted as bi-directional. However, in other examples, communications between controller 108 and automation system 102 may be unidirectional. In these other examples, controller 108 may only send information to automation system 102 and automation system 102 may only receive information from automation system 102.

Figure 2:
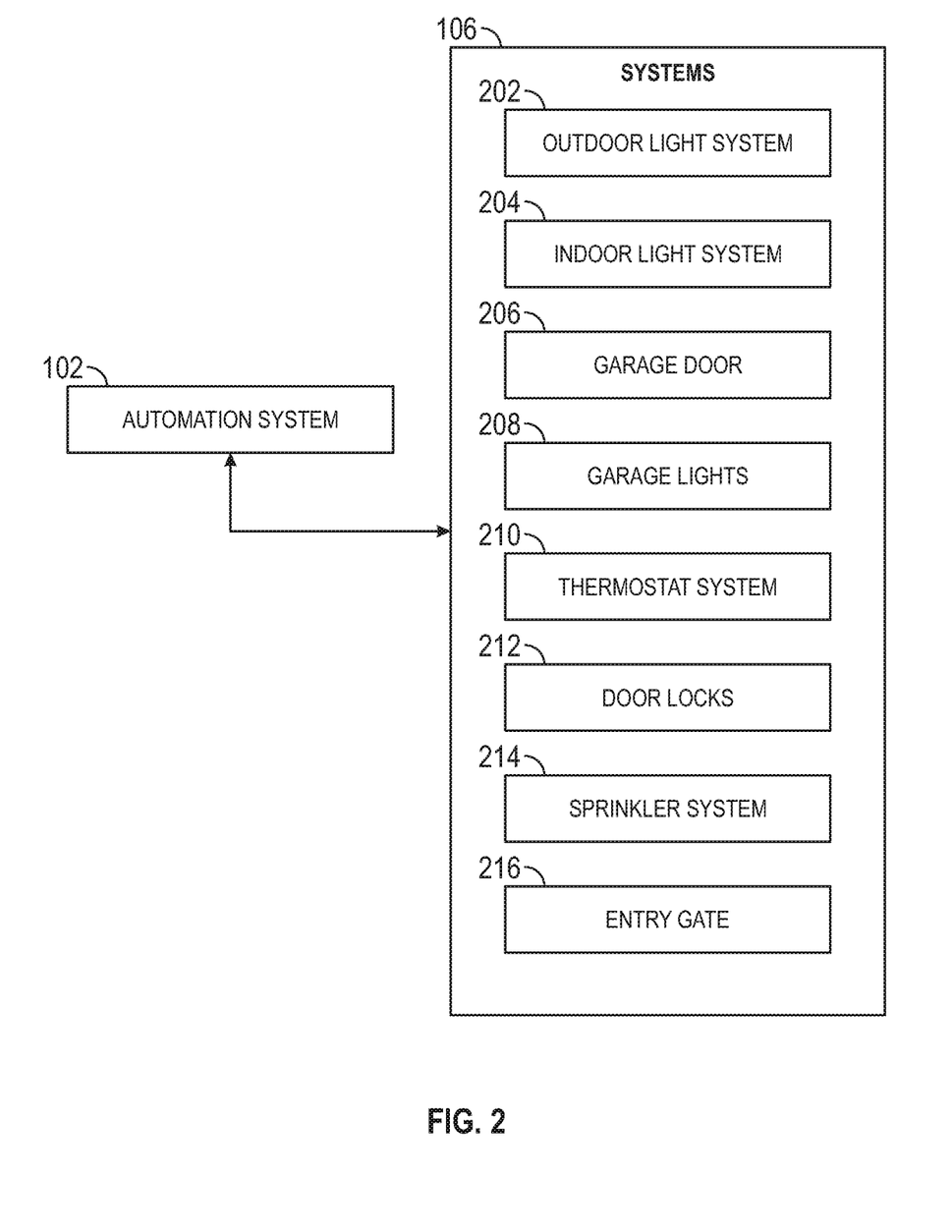
FIG. 2 is a block diagram of systems that may be controlled by an automation system from FIG. 1 in accordance with an example embodiment.

FIG. 2 is a block diagram of systems 106 from FIG. 1 that may be controlled by automation system 102 from FIG. 1 in accordance with an example embodiment. Automation system 102 is used to automate operations by systems 106. Systems 106 may include, without limitation, one or more of outdoor light system 202, indoor light system 204, garage door 206, garage lights 208, thermostat system 210, door locks 212, sprinkler system 214, and entry gate 216.

Outdoor light system 202 may include one or more lighting devices positioned outdoors with respect to a home, building, or complex at location 104 in FIG. 1. For example, outdoor light system 202 may include at least one of a porch light, a light by an entry gate, an outdoor light by a garage, a driveway lighting system, a yard lighting system, or some other type of outdoor light. Although these types of lights are described as being part of outdoor light system 202, in other examples, one or more of these lighting devices or systems may be separate and independent systems. Automation system 102 may be used to turn on and turn off the various lights in outdoor light system 202.

Indoor light system 204 may include one or more lighting devices positioned indoors with respect to a home, building, or complex at location 104 in FIG. 1. For example, indoor light system 204 may include an indoor entry light, a lighting system inside a garage, an apartment light, or some other type of indoor light. Although these types of lights are described as being part of indoor light system 204, in other examples, one or more of these lighting devices or systems may be separate and independent systems. Automation system 102 may be used to turn on and turn off the various lights in indoor light system 204.

In one example, thermostat system 210 is an independent system that controls an indoor temperature with respect to a home, building, or complex at location 104 in FIG. 1. In other examples, indoor light system 204 may be integrated as part of thermostat system 210. Automation system 102 may be used to control the temperature settings of thermostat system 210.

Garage door 206 may be the garage door for a house, an apartment complex, or some other type of building. In some examples, garage door 206 and garage lights 208 are independent systems. In other examples, garage door 206 and garage lights 208 are integrated as one system. Garage lights 208 may include one or more lights outside of a garage, one or more lights inside a garage, or both. Automation system 102 may be used to control the opening and closing of garage door 206 and the turning on and off of garage lights 208.

Door locks 212 may include the locking mechanism for at least one of a front door, a rear door, a garage door, or some other type of door. Automation system 102 may be used to control the locking and unlocking of these various doors. Sprinkler system 214 may include front yard sprinklers, side yard sprinklers, back yard sprinklers, other types of sprinklers, or a combination thereof. Automation system 102 may be used to control at least one of the turning on and off of these sprinklers, the pausing of a sprinkler program, or the delay of a sprinkler program run by sprinkler system 214. In this manner, automation system 102 may prevent an authorized person from getting wet by sprinkler system 214 when the authorized person exits vehicle 112.

Entry gate 216 may be, for example, a vehicle entry gate at an apartment complex, a business complex, or some other type of building, parking lot, or complex. Automation system 102 may be used to control the opening and closing of entry gate 216.

Figure 3:
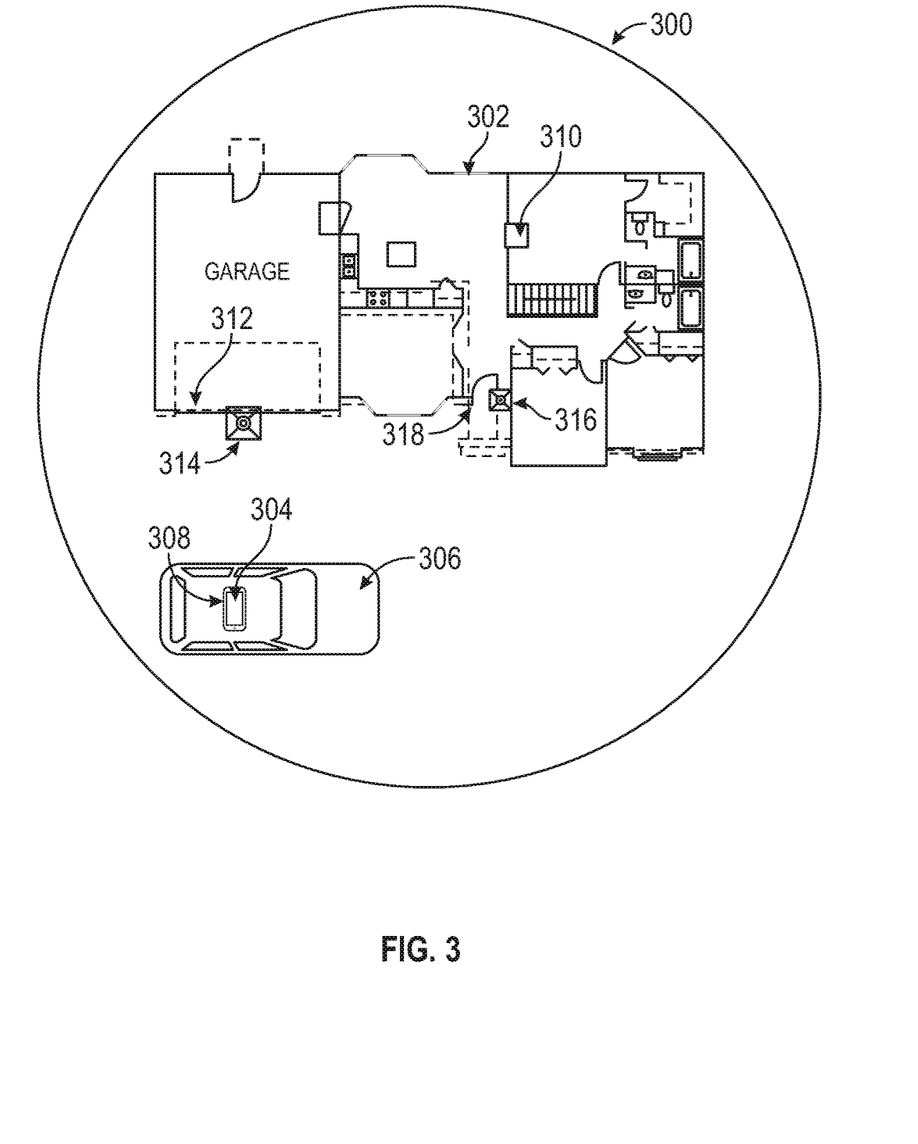
FIG. 3 is an illustration of a top view of a geo-fence in accordance with an example embodiment.

FIG. 3 is an illustration of a top view of a geo-fence 300 in accordance with an example embodiment. Geo-fence 300 is an example of one implementation for geo-fence 126 in FIG. 1. Geo-fence 300 is a virtual boundary around home 302. Home 302 is an example of one implementation for location 104 in FIG. 1. As illustrated in FIG. 3, mobile device 304 and vehicle 306 have entered geo-fence 300. Mobile device 304 and vehicle 306 are examples of implementations for mobile device 110 and vehicle 112, respectively, in FIG. 1. In this illustrative example, automation control system 308 is implemented using a controller, mobile device 304 and optionally, vehicle 306. The controller may be implemented as part of mobile device 304 or optionally as part of both mobile device 304 and vehicle 306.

Mobile device 304 belongs to a resident of home 302, who is driving vehicle 306. Automation control system 308 detects the arrival of the resident within geo-fence 300 using, for example, GPS information generated by mobile device 304, GPS information generated by vehicle 306, or both.

Once the resident's arrival within geo-fence 300 is detected, automation control system 308 determines whether mobile device 304 is connected to vehicle 306. Mobile device 304 may be connected to vehicle 306 via Bluetooth, WiFi, USB, or some other wired or wireless connection. In FIG. 3, mobile device 304 is connected to vehicle 306. Automation control system 308 therefore recognizes vehicle 306 as a registered vehicle.

Accordingly, automation control system 308 controls automation system 310 at home 302 to run a first program. For example, mobile device 304 or vehicle 306 may establish a wireless communications link with automation system 310. Automation control system 308 may then send a code, a command, a message, instructions, or some other type of information to cause automation system 310 to run the first program.

Running the first program may include, for example, opening garage door 312, turning on garage light 314, turning on front porch light 316, and unlocking front door 318. These operations are customized based on vehicle 306 being a registered vehicle.

Figure 4:
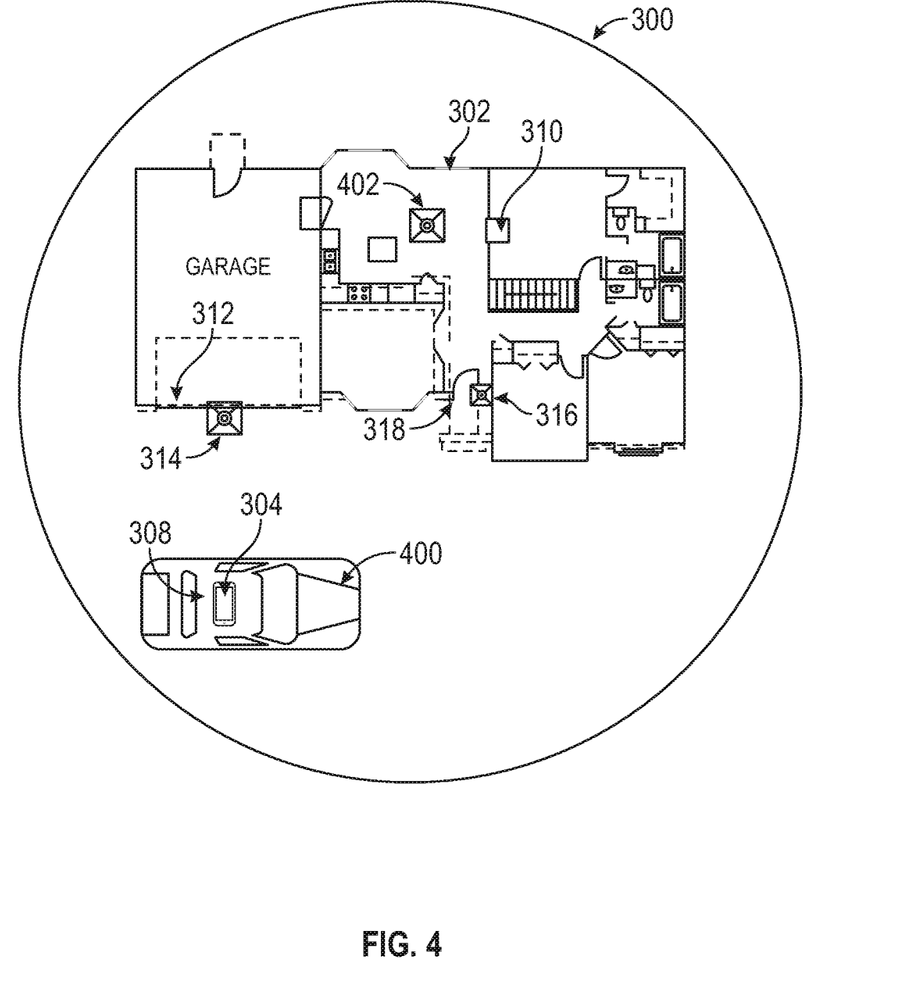
FIG. 4 is an illustration of a top view of a geo-fence in accordance with an example embodiment.

FIG. 4 is an illustration of a top view of geo-fence 300 from FIG. 3 in accordance with an example embodiment. In this illustrative example, the resident of home 302 arrives in a different vehicle than vehicle 306 from FIG. 3. In particular, the resident enters geo-fence 300 driving vehicle 400. Vehicle 400 may be, for example, a friend's vehicle, a ride-share vehicle, a taxi, or some other type of vehicle.

Automation control system 308 detects the arrival of the resident within geo-fence 300 using GPS information generated by mobile device 304. Once the resident's arrival within geo-fence 300 is detected, automation control system 308 determines whether mobile device 304 is connected to vehicle 400. As previously described, mobile device 304 may be connected to vehicle 400 via Bluetooth, WiFi, USB, or some other wired or wireless connection. In FIG. 4, mobile device 304 is not connected to vehicle 400. Automation control system 308 therefore does not recognize vehicle 400 as a registered vehicle. Rather, automation control system 308 may recognize vehicle 400 as an unregistered vehicle.

Accordingly, automation control system 308 controls automation system 310 at home 302 to run a second program. For example, mobile device 304 may establish a wireless communications link with automation system 310. Automation control system 308 may then send a code, a command, a message, instructions, or some other type of information to cause automation system 310 to run the second program. Running the second program may include, for example, turning on front porch light 316, unlocking front door 318, and turning on indoor lighting system 402. These operations are customized based on vehicle 400 not being a registered vehicle. Because vehicle 400 is not a registered vehicle, garage door 312 is not opened and garage light 314 is not turned on.

Figure 5:
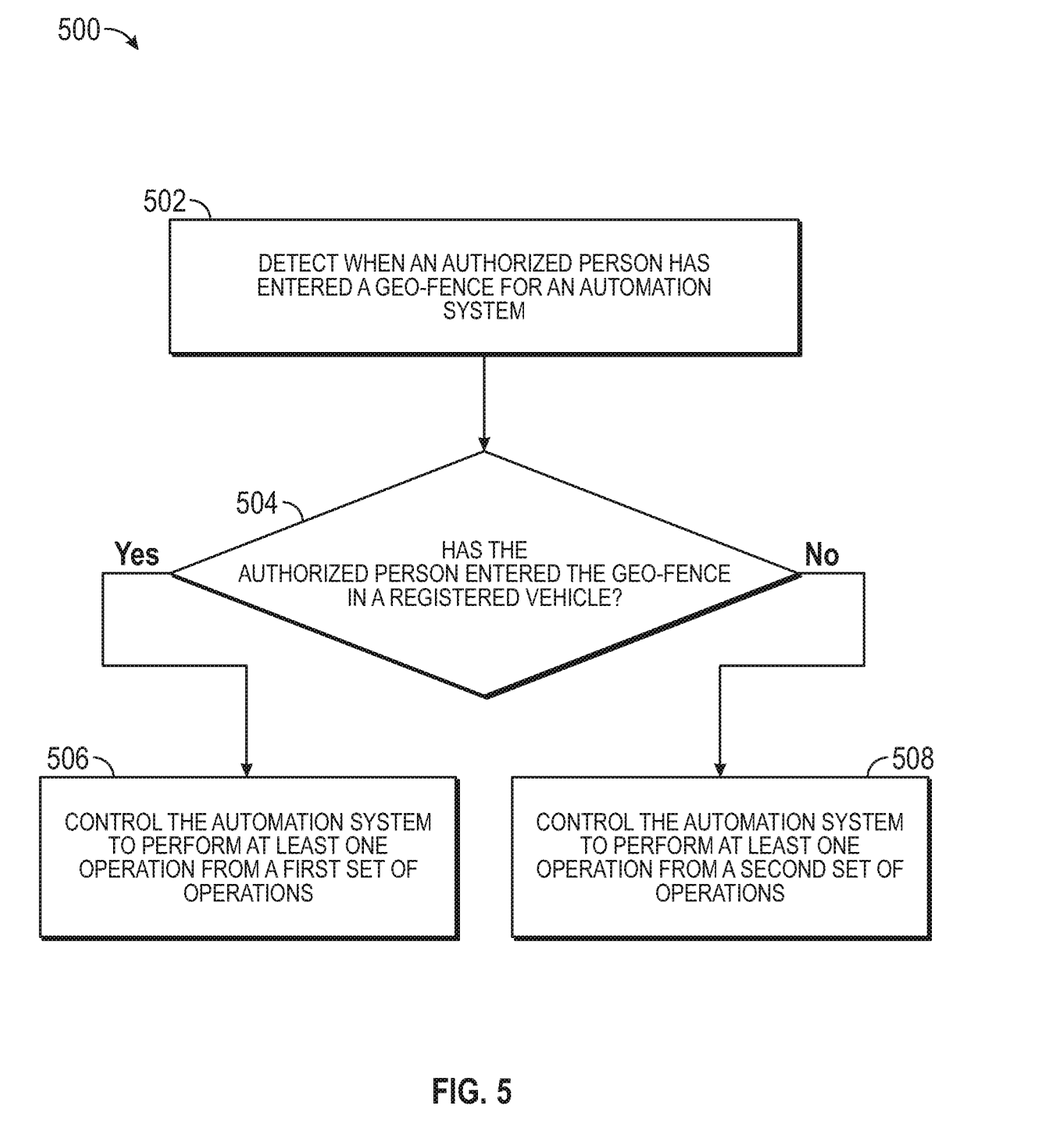
FIG. 5 is a flowchart of a method for controlling an automation system in accordance with an example embodiment.

FIG. 5 is a flowchart of a method 500 for controlling an automation system in accordance with an example embodiment. Method 500 is illustrated as a set of operations or steps 502 through 508 and is described with continuing reference to FIGS. 1 and 2. Not all of the illustrated steps 502 through 508 may be performed in all embodiments of method 500. Additionally, one or more steps that are not expressly illustrated in FIG. 5 may be included before, after, in between, or as part of the steps 502 through 508. In some embodiments, one or more of the steps 502 through 508 may be implemented, at least in part, in the form of executable code stored on non-transitory, tangible, machine-readable media that when run by one or more processors may cause the one or more processors to perform one or more of the processes. In one or more embodiments, the steps 502 through 508 may be performed by automation control system 100 from FIG. 1. Further, one or more of processes 502 through 508 may be performed by controller 108 of automation control system 100 from FIG. 1.

Method 500 may begin by automation control system 100 detecting when an authorized person has entered a geo-fence for an automation system (step 502). Step 502 may be performed in a number of different ways. In one or more examples, step 502 includes a controller, such as controller 108 in FIG. 1, detecting when the authorized person has entered the geo-fence using a positioning system. In particular, the controller may use positioning information (e.g., GPS information) generated by the positioning system to detect when the authorized person has entered the geo-fence.

The positioning system may be part of a mobile device that belongs to the authorized person. In some cases, the mobile device may be recognized as belonging to the authorized person if the mobile device is registered with the automation system or if the mobile device has an application installed on the mobile device corresponding to the automation system. The positioning system of the mobile device provides GPS information that is used to determine whether the authorized person has entered the geo-fence. The geo-fence may surround the entirety of or a portion of a home, a building, or a complex. In other examples, step 502 includes detecting when the authorized person has entered the geo-fence using a positioning system of a vehicle being driven by the authorized person. For example, the positioning system may provide GPS information from a vehicle being driven by the authorized person.

A determination is then made as to whether the authorized person has entered the geo-fence in a registered vehicle (step 504). As previously described, a "registered vehicle" is a vehicle that is owned by the authorized person, registered to the authorized person, or otherwise identified as corresponding to the authorized person. In one or more examples, the determination in step 504 is made by determining whether a mobile device of the authorized person has connected to the vehicle. The mobile device may be connected to the vehicle via a wired or wireless connection. For example, the mobile device may be connected to the vehicle via Bluetooth, WiFi, USB, or some other type of connection. If the mobile device of the authorized person is connected to the vehicle, then the vehicle may be determined to be a "registered vehicle." In other illustrative examples, a registered vehicle may also be referred to as an authorized vehicle or an approved vehicle. For example, the registered vehicle may be a particular vehicle that has been registered to the automation system. A vehicle may be registered to an automation system by being coded or keyed into the automation system.

In other examples, a code corresponding to the vehicle, a vehicle identification number (VIN) for the vehicle, or some other identifying information may be used to determine that the vehicle is a registered vehicle. For example, in addition to determining whether a mobile device of the authorized person is connected to the vehicle, step 504 may also include determining whether the mobile device has received a code, a key, identification information, the vehicle VIN, or some other information from the vehicle indicating that the vehicle is a "registered vehicle" (i.e., authorized or approved by the automation system).

Referring to step 504, if a determination is made that the authorized person has entered the geo-fence in a registered vehicle, automation control system 100 controls the automation system to perform at least one operation from a first set of operations (step 506). If, however, at step 504, automation control system 100 determines that the authorized person has not entered the geo-fence in a registered vehicle, the automation system is controlled to perform at least one operation from a second set of operations (step 508).

Control of the automation system in steps 506 and 508 may be performed in a number of different ways. In one or more examples, the mobile device may establish a wireless communications link with the automation system. The mobile device may then control the automation system by sending instructions to the automation system. In other examples, the vehicle may establish a wireless communications link with the automation system. The vehicle may then control the automation system by sending instructions to the automation system. The instructions sent by the mobile device, the vehicle, or both to the automation system may include instructions for controlling the various systems operated by the automation system. In some cases, the instructions may include a code that initiates a program.

For example, at step 506, the mobile device or the vehicle may send a code, message, command, or other information to the automation system over a wireless communications link that initiates a first program for performing at least one operation from the first set of operations. At step 508, the mobile device or the vehicle may send a code, message, command, or other information to the automation system over a wireless communications link that initiates a second program for performing at least one operation from the second set of operations. The second set of operations may include at least one operation that is different from the operations in the first set of operations.

The first set of operations described in step 506 may include, for example, at least one of opening a garage door, unlocking an interior garage door, turning on a driveway light, changing a mode of a thermostat, or turning on a light inside a garage. In some examples, the first set of operations may include opening an entry gate at a building or complex.

The second set of operations described in step 508 may include, for example, at least one of turning on a front porch light, unlocking a front door, turning on a front path light, changing a mode of a thermostat, turning on an entryway light inside a home, turning off a sprinkler system, or pausing a program of the sprinkler system. In some examples, the first set of operations may include dialing an entry station. The entry station may be, for example, a security station, a receptionist station, or some other type of station.

Figure 6:
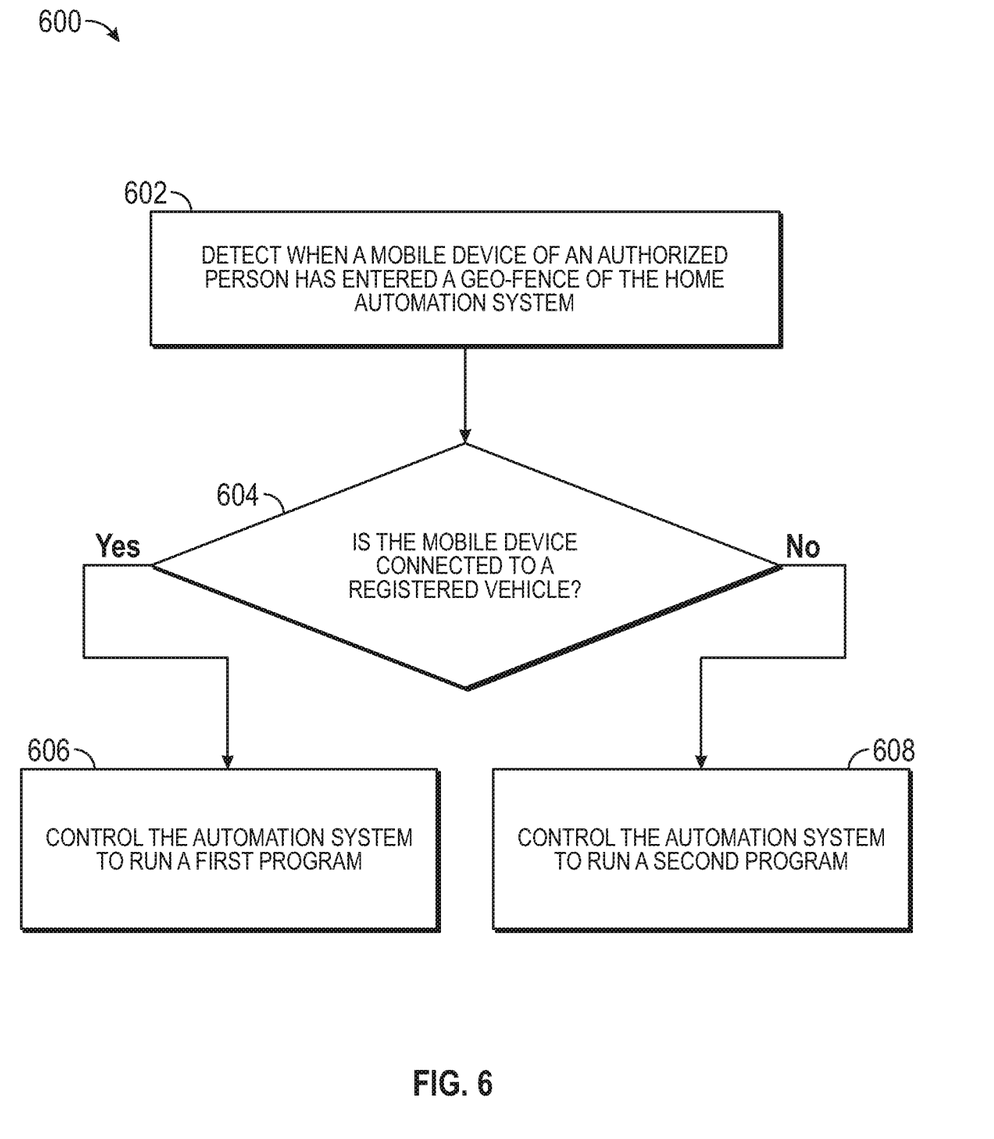
FIG. 6 is a flowchart of a method for controlling a home automation system in accordance with an example embodiment.

FIG. 6 is a flowchart of a method 600 for controlling a home automation system in accordance with an example embodiment. Method 600 is illustrated as a set of operations or steps 602 through 608 and is described with continuing reference to FIGS. 1 and 2. Not all of the illustrated steps 602 through 608 may be performed in all embodiments of method 600. Additionally, one or more steps that are not expressly illustrated in FIG. 6 may be included before, after, in between, or as part of the steps 602 through 608. In some embodiments, one or more of the steps 602 through 608 may be implemented, at least in part, in the form of executable code stored on non-transitory, tangible, machine-readable media that when run by one or more processors may cause the one or more processors to perform one or more of the processes. In one or more embodiments, the steps 602 through 608 may be performed by automation control system 100 from FIG. 1. Further, one or more of processes 602 through 608 may be performed by controller 108 of automation control system 100 from FIG. 1.

Method 600 may begin by detecting when a mobile device of an authorized person has entered a geo-fence of the home automation system (step 602). Step 602 may include using, for example, GPS information provided by the mobile device to detect when the mobile device enters the geo-fence.

Thereafter, a determination is made as to whether the mobile device is connected to a registered vehicle (step 604). The mobile device may be connected to a vehicle via Bluetooth, USB, WiFi, or some other type of wired or wireless connection. If the mobile device is connected to a registered vehicle, the home automation system is controlled to run a first program (step 606). Alternatively, if the mobile device is not connected to a registered vehicle, the home automation system is controlled to run a second program (step 608). In this manner, the first program is run at step 606 when the authorized person arrives within the geo-fence in an authorized vehicle (e.g., his or her own vehicle) and the second program is run at step 608 when the authorized person arrives within the geo-fence in a different vehicle that is not authorized (e.g., a rental vehicle, a friend's vehicle, a ride-share vehicle, a taxi, etc.).

Step 606 may include establishing a wireless communications link between the home automation system and either the mobile device or the vehicle. At step 606, the automation system is controlled to run the first program to perform one or more operations that are customized based on the arrival of the authorized person in the authorized vehicle. For example, the first program may be run to at least one of open a garage door, unlock an interior garage door, turn on a driveway light, change a mode of a thermostat, turn on a light inside a garage, or perform some other type of operation.

In some cases, controlling the automation system to run the first program includes controlling the automation system to open a garage door corresponding to the registered vehicle from a plurality of garage doors. For example, the automation control system may send instructions to run the first program along with identification information corresponding to the registered vehicle. The identification information may be a name, a code, a key, the vehicle VIN, or some other type of identification information. In running the first program, the automation system identifies a garage door, from a plurality of garage doors, corresponding to the registered vehicle based on the identification information for the registered vehicle. The automation system then opens the identified garage door. As one illustrative example, when the home has two garage doors and the registered vehicle is designated for the left garage door space, only the left garage door may be opened in response to the arrival of the registered vehicle.

Step 608 may include establishing a wireless communications link between the home automation system and the mobile device. At step 606, the automation system is controlled to run the second program to perform one or more operations that are customized based on the arrival of the authorized person in a vehicle that has not been authorized.

For example, the second program may be run to at least one of turn on a front porch light, unlock a front door, turn on a front path light, change a mode of a thermostat, turn on an entryway light inside a home, turn off a sprinkler system, pause a program of the sprinkler system, or perform some other type of operation.

While certain exemplary embodiments of the invention have been described and shown in the accompanying drawings, it is to be understood that such embodiments are merely illustrative of and not restrictive on the broad invention, and that the embodiments of the invention not be limited to the specific constructions and arrangements shown and described, since various other modifications may occur to those ordinarily skilled in the art. The intention is to cover all modifications, equivalents and alternatives falling within the spirit and scope of the disclosure as defined by the claims.

What is claimed is:

1. A method for controlling an automation system, the method comprising:
    detecting, by an automation control system, when an authorized person has entered a geo-fence for the automation system based on whether a mobile device of the authorized person has entered the geo-fence;
    determining, by the automation control system, whether the mobile device of the authorized person has received information from a vehicle in which the authorized person has entered the geo-fence, wherein the information identifies the vehicle as a registered vehicle;
    controlling, by the automation control system, the automation system to perform at least one operation from a first set of operations in response to a determination that the authorized person has entered the geo-fence in the registered vehicle; and
    controlling, by the automation control system, the automation system to perform at least one operation from a second set of operations in response to a determination that the authorized person has not entered the geo-fence in the registered vehicle;
    wherein controlling, by the automation control system, the automation system to perform the at least one operation from the first set of operations comprises:
        establishing, by the registered vehicle, a wireless communications link between the automation system and the registered vehicle in response to the determination that the authorized person has entered the geo-fence in the registered vehicle; and
        sending, by the registered vehicle, information to the automation system over the wireless communications link established between the automation system and the registered vehicle.

2. The method of claim 1, wherein detecting, by the automation control system, when the authorized person has entered the geo-fence comprises:
    detecting when the authorized person has entered the geo-fence using a positioning system of the mobile device of the authorized person that has been registered with the automation system.

3. The method of claim 1, wherein detecting, by the automation control system, when the authorized person has entered the geo-fence comprises:
    detecting when the authorized person has entered the geo-fence using a positioning system of the registered vehicle being driven by the authorized person.

4. The method of claim 3, wherein determining, by the automation control system, whether the mobile device of the authorized person has received the information comprises:
    determining, by a controller, whether the mobile device has received at least one of a code or a vehicle identification number for the vehicle from the vehicle and whether the at least one of the code or the vehicle identification number indicates that the vehicle is the registered vehicle.

5. The method of claim 1, wherein the automation system is a home automation system and wherein controlling, by the automation control system, the automation system to perform the at least one operation from the first set of operations comprises:
    controlling, by the automation control system, the automation system to perform at least one of opening a garage door, unlocking an interior garage door, turning on a driveway light, changing a mode of a thermostat, or turning on a light inside a garage.

6. The method of claim 1, wherein the automation system is a home automation system and wherein controlling, by the automation control system, the automation system to perform the at least one operation from the second set of operations comprises:
    controlling, by the automation control system, the automation system to perform at least one of turning on a front porch light, unlocking a front door, turning on a front path light, changing a mode of a thermostat, turning on an entryway light inside a home, turning off a sprinkler system, or pausing a program of the sprinkler system.

7. The method of claim 1, wherein the first set of operations includes at least one operation that is not included in the second set of operations.

8. The method of claim 1, wherein controlling, by the automation control system, the automation system to perform the at least one operation from the first set of operations comprises:
    controlling, by the automation control system, the automation system to open a gate of a complex in response to the determination that the authorized person has entered the geo-fence in the registered vehicle, wherein the complex is one of a business complex or an apartment complex.

9. The method of claim 1, wherein controlling, by the automation control system, the automation system to perform at least one operation from the second set of operations comprises:
    controlling, by the automation control system, the automation system to dial an entry station in response to a determination that the authorized person has not entered the geo-fence in the registered vehicle, wherein the entry station is one of a security station or a receptionist station.

10. The method of claim 1, wherein controlling, by the automation control system, the automation system to perform the at least one operation from the first set of operations comprises:
    controlling, by the automation control system, the automation system to open a garage door corresponding to the registered vehicle from a plurality of garage doors in response to the determination that the authorized person has entered the geo-fence in the registered vehicle.

11. The method of claim 1, wherein the geo-fence is a defined area around one of a home, an apartment complex, or a business complex.

12. A method of controlling a home automation system, the method comprising:

detecting when a mobile device of an authorized person has entered a geo-fence of the home automation system based on whether a mobile device of the authorized person has entered the geo-fence;

determining whether the mobile device of the authorized person has received information from a vehicle in which the authorized person has entered the geo-fence, wherein the information identifies the vehicle as a registered vehicle; and controlling the home automation system to run a first program in response to a determination that the authorized person has entered the geo-fence in the registered vehicle; and controlling the home automation system to run a second program in response to a determination that the vehicle in which the authorized person has not entered the geo-fence in the registered vehicle;

wherein controlling the home automation system to run the first program comprises:

establishing, by the registered vehicle, a wireless communications link between the home automation system and the registered vehicle in response to the determination that the authorized person has entered the geo-fence in the registered vehicle; and sending, by the registered vehicle, information to the home automation system over the wireless communications link established between the home automation system and the registered vehicle.

13. The method of claim 12, wherein controlling the home automation system to run the first program comprises:
controlling the home automation system to perform at least one of opening a garage door, unlocking an interior garage door, turning on a driveway light, changing a mode of a thermostat, or turning on a light inside a garage in response to the determination that the authorized person has entered the geo-fence in the registered vehicle.

14. The method of claim 12, wherein controlling the home automation system to run the second program comprises:
controlling the home automation system to perform at least one of turning on a front porch light, unlocking a front door, turning on a front path light, changing a mode of a thermostat, turning on an entryway light inside a home, turning off a sprinkler system, or pausing a program of the sprinkler system in response to the determination that the authorized person has not entered the geo-fence in the registered vehicle.

15. The method of claim 12, wherein controlling the home automation system to run the first program comprises:
controlling the home automation system to open a garage door corresponding to the registered vehicle from a plurality of garage doors in response to the determination that the authorized person has entered the geo-fence in the registered vehicle.

16. The method of claim 12, wherein controlling the home automation system to run the second program comprises:
establishing, by the mobile device, a wireless communications link between the home automation system and the mobile device.

17. The method of claim 12, wherein the second program is customized to perform at least one of turning off a sprinkler system or pausing a program of the sprinkler system.

18. A system for controlling an automation system, the system comprising:
a communications system that establishes a communications link with the automation system;
a positioning system in a mobile device that generates positioning information; and
a controller that:
detects when the mobile device of an authorized person has entered a geo-fence of the automation system based on the positioning information generated by the positioning system;
determines whether the mobile device has received information from a vehicle in which the authorized person has entered the geo-fence, wherein the information identifies the vehicle as a registered vehicle;
controls the automation system to run a first program in response to a determination that the mobile device has received the information identifying the vehicle as the registered vehicle; and
controls the automation system to run a second program in response to a determination that the mobile device has not received the information identifying the vehicle as the registered vehicle;
wherein the communications system is part of the registered vehicle; and
wherein, to control the automation system to run the first program, the controller:
establishes the communications link between the automation system and the registered vehicle via the communications system in response to the determination that the mobile device has received the information identifying the vehicle as the registered vehicle; and
sends information to the automation system over the communications link established between the automation system and the registered vehicle via the communications system.

19. The system of claim 18, wherein the second program is customized to perform at least one of turning off a sprinkler system or pausing a program of the sprinkler system.

20. The system of claim 18, wherein the first program is customized to perform at least one of opening a garage door, unlocking an interior garage door, turning on a driveway light, changing a mode of a thermostat, or turning on a light inside a garage and wherein the second program is customized to perform at least one of turning on a front porch light, unlocking a front door, turning on a front path light, changing a mode of a thermostat, turning on an entryway light inside a home, turning off a sprinkler system, or pausing a program of the sprinkler system.

* * * * *